(12) United States Patent
Duval (10) Patent No.: US 12,061,820 B2
(45) Date of Patent: Aug. 13, 2024

(54) TECHNIQUES FOR STORING JOURNALING INFORMATION

(71) Applicant: Micron Technology, Inc., Boise, ID (US)

(72) Inventor: Olivier Duval, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/818,920

(22) Filed: Aug. 10, 2022

(65) Prior Publication Data

US 2024/0053921 A1 Feb. 15, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679
See application file for complete search history.

(56) References Cited

U.S. PATENT DOCUMENTS

| | | | | |
|---|---|---|---|---|
| 6,321,308 B1* | 11/2001 | Arnon | ................... | G06F 3/0689 710/39 |
| 6,901,386 B1* | 5/2005 | Dedrick | ................. | G06Q 10/10 713/193 |
| 7,937,499 B1* | 5/2011 | Tripathi | ................... | H04L 49/90 709/250 |
| 10,152,275 B1* | 12/2018 | Tsirkin | ................... | G06F 3/0656 |
| 10,996,957 B1* | 5/2021 | Carlson | ................. | G06F 9/3013 |
| 11,347,896 B1* | 5/2022 | Brown, Jr. | ............... | G06F 21/73 |
| 2002/0035663 A1* | 3/2002 | Finn | .......................... | G06F 5/14 370/314 |
| 2006/0075208 A1* | 4/2006 | Jones | ................... | G06F 9/30181 712/E9.043 |
| 2007/0186065 A1* | 8/2007 | Lee | ........................ | G06F 3/0674 711/159 |
| 2009/0240793 A1* | 9/2009 | Zhang | ................. | H04L 49/9031 709/223 |
| 2010/0046604 A1* | 2/2010 | Elstermann | ...... | H04N 21/23406 375/240.01 |
| 2011/0219222 A1* | 9/2011 | Eichenberger | ...... | G06F 11/3466 712/241 |

(Continued)

*Primary Examiner* — Eric T Loonan
(74) *Attorney, Agent, or Firm* — Holland & Hart LLP (57) ABSTRACT

Methods, systems, and devices for techniques for storing journaling information are described. A memory device may receive a first command to configure a circular buffer using memory cells of a nonvolatile memory device. The first command may include one or more labels associated with the circular buffer. The memory device may configure the circular buffer based at least in part on receiving the first command. The memory device may receive a second command to write journaling data to the nonvolatile memory device based at least in part on configuring the circular buffer. The second command may specify a label of the one or more labels. The memory device may generate an entry at a physical address indicated by a pointer of the circular buffer available to store the journaling data in the circular buffer based at least in part on the label specified by the second command.

25 Claims, 5 Drawing Sheets

(56) References Cited

U.S. PATENT DOCUMENTS

| | | | |
|---|---|---|---|
| 2012/0185439 A1* | 7/2012 | Chen | G06F 16/24568 707/661 |
| 2018/0136877 A1* | 5/2018 | Ouyang | G11C 16/32 |
| 2020/0218449 A1* | 7/2020 | Leitao | G06F 3/0619 |

* cited by examiner

TECHNIQUES FOR STORING JOURNALING INFORMATION

FIELD OF TECHNOLOGY

The following relates to one or more systems for memory, including techniques for storing journaling information.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Many memory systems use journal information to help improve operations of the memory systems. Journal information is temporary and may not be useful after a long period of time. For example, some journal information may be outdated after a few seconds. File systems and databases use journaling in part to write temporary data or files to a storage device in order to restore system integrity in case of a failure event such as a power loss event. The data is typically written to the storage device prior to a transaction and deleted when the transaction is complete. This can result in write amplification due to the high rate at which small amounts of information are being created and deleted. Write amplification may also prematurely end the operational life of the storage device. Additionally, significant overhead may be used to maintain the locations of files that are written and deleted. Many NAND systems may be designed to store data for much longer periods of time. Some of the processes to store data for longer periods of time, however, may increase the latency associated with writing the data.

Methods, systems, and devices for techniques for storing journaling information are described. A memory device may receive a first command to configure a circular buffer using memory cells of a nonvolatile memory device. The first command may include one or more labels associated with the circular buffer. The memory device may configure the circular buffer based at least in part on receiving the first command. The memory device may receive a second command to write journaling data to the nonvolatile memory device based at least in part on configuring the circular buffer. The second command may specify a label of the one or more labels. The memory device may generate an entry at a physical address indicated by a pointer of the circular buffer available to store the journaling data in the circular buffer based at least in part on the label specified by the second command. Examples of specific commands for configuring and accessing the circular buffer may include a "set configuration" command to configure a circular buffer, a "get configuration" command to retrieve the configuration of one or more existing circular buffers, an "add entry" command to add information to the circular buffer, a "delete entry" command to invalidate information previously stored in the circular buffer, and a restore command to read the valid data in the circular buffer.

The disclosed techniques may reduce some of the adverse effects of write amplification by using a circular buffer with a single write pointer in a black box type implementation to store the journaling information while facilitating efficient and effective operations. The disclosed techniques may also reduce the overhead associated with maintaining the location of files being written and deleted. Additionally, the circular buffers may reduce the latency associated with write operations for journaling data.

Figure 1:
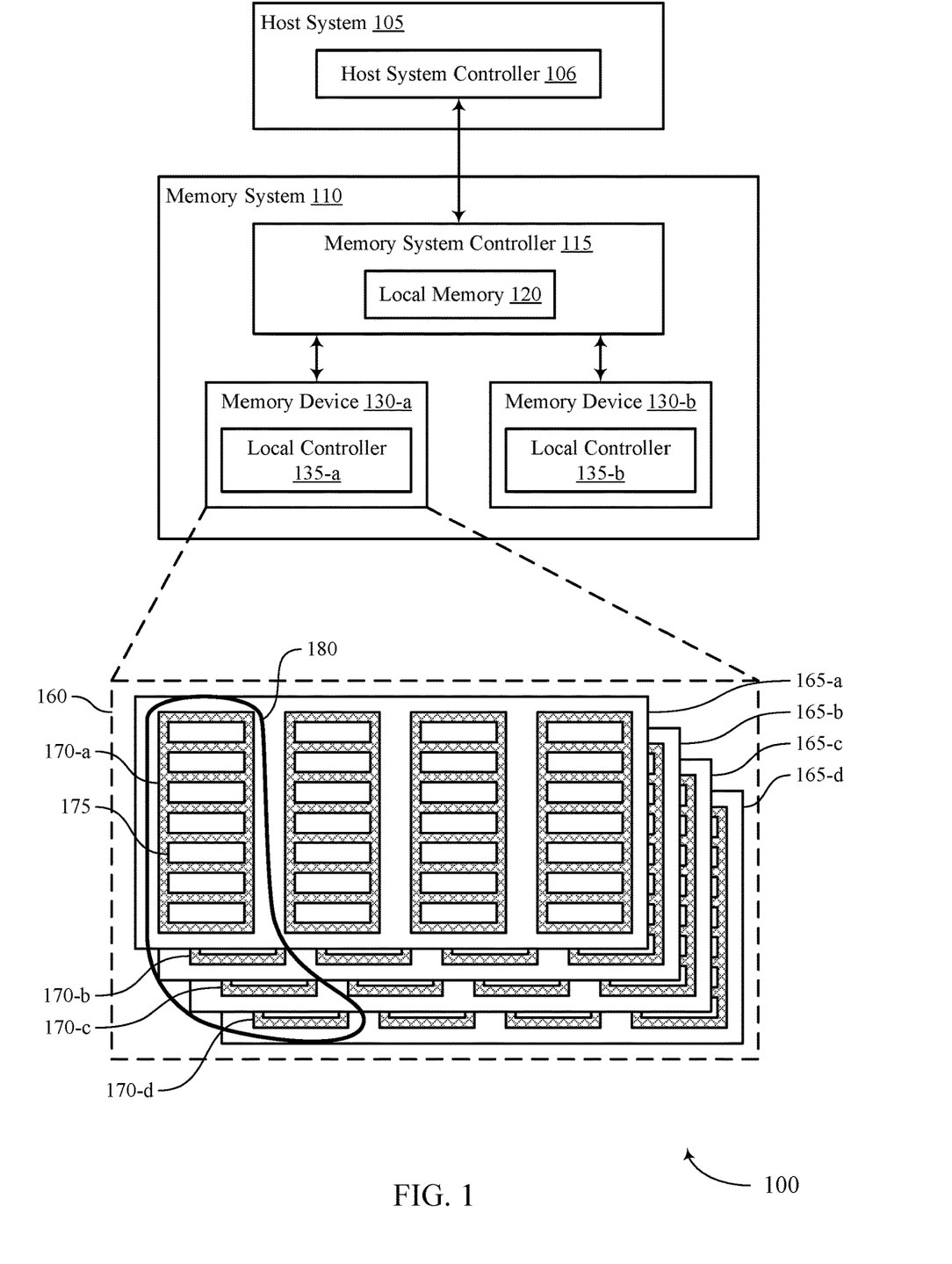
FIG. 1 illustrates an example of a system that supports techniques for storing journaling information in accordance with examples as disclosed herein.

Features of the disclosure are initially described in the context of systems, devices, and circuits with reference to FIG. 1. Features of the disclosure are described in the context of a system that supports techniques for storing journaling information with reference to FIGS. 2 and 3. These and other features of the disclosure are further illustrated by and described in the context of an apparatus diagram and flowchart that relate to techniques for storing journaling information with reference to FIGS. 4 and 5.

FIG. 1 illustrates an example of a system 100 that supports techniques for storing journaling information in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for storing journaling information. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may receive a first command to configure a circular buffer using memory cells of a nonvolatile memory device (e.g., memory device 130-a). The first command may include one or more labels associated with the circular buffer. The memory system 110 may configure the circular buffer based at least in part on receiving the first command. The memory system 110 may receive a second command to write journaling data to the nonvolatile memory device (e.g., memory device 130-a) based at least in part on configuring the circular buffer. The second command may specify a label of the one or more labels. The memory system 110 may generate an entry at a physical address indicated by a pointer of the circular buffer available to store the journaling data in the circular buffer based at least in part on the label specified by the second command. Examples of specific commands for configuring and accessing the circular buffer may include a "set configuration" command to configure a circular buffer, a "get configuration" command to retrieve the configuration of one or more existing circular buffers, an "add entry" command to add information to the circular buffer, a "delete entry" command to invalidate information previously stored in the circular buffer, and a restore command to read the valid data in the circular buffer.

Figure 2:
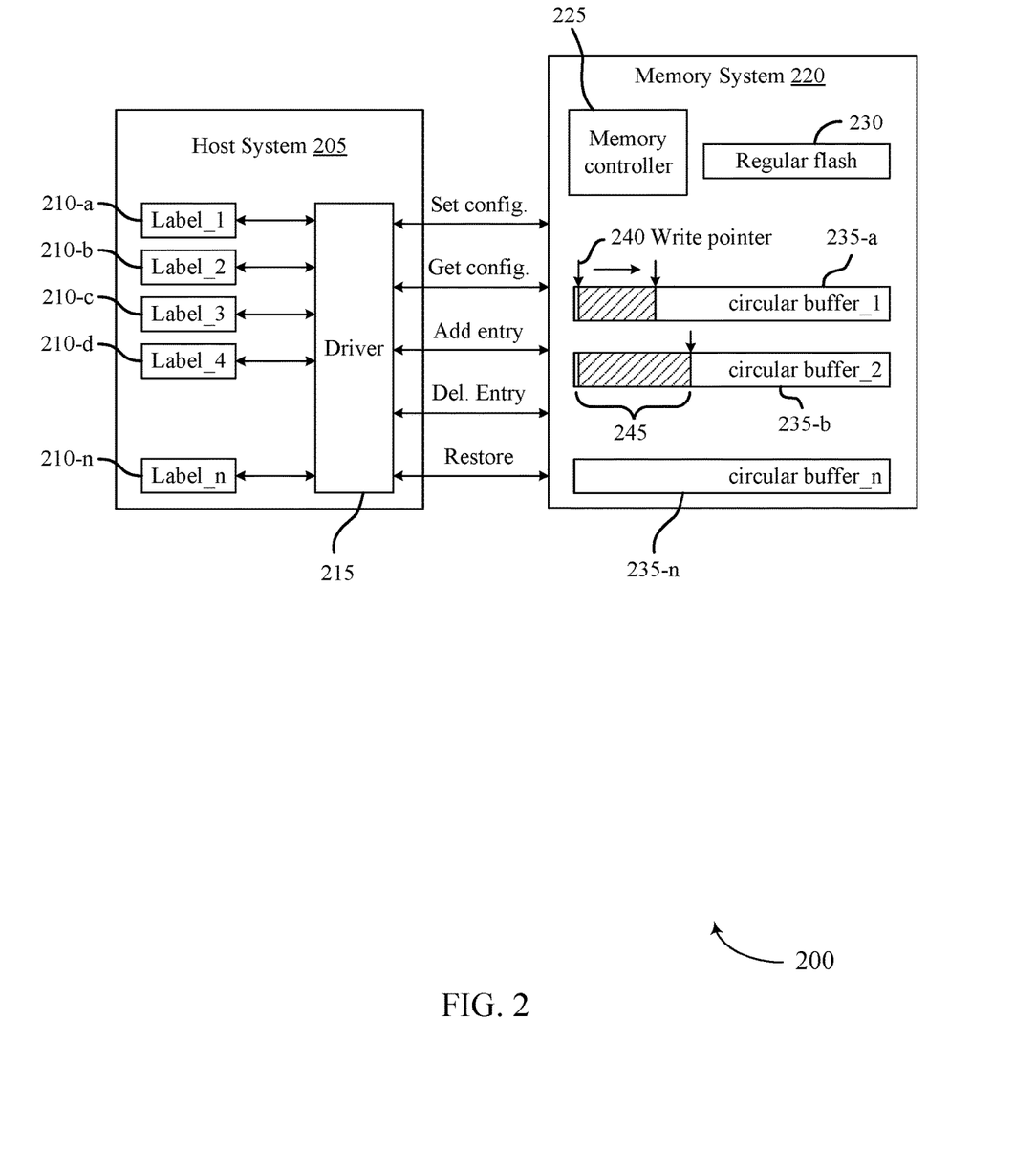
FIG. 2 illustrates an example of a system that supports techniques for storing journaling information in accordance with examples as disclosed herein.

FIG. 2 illustrates an example of a system 200 that supports techniques for storing journaling information in accordance with examples as disclosed herein. The system 200 includes a host system 205 that uses a memory system 220 to store its journaling information associated with transactions. In some examples, the host system 205 may be in the form of a general purpose computer capable of implementing single or multiple simultaneous configurations. In some examples, the host system 205 may include a plurality of labels such as Label_1 210-a, label_2 210-b, Label_3 210-c, Label_4 210-d, and Label n 210-n (collectively label 210). Each label 210 may represent a subsystem that may access a storage device (not shown) associated with the host system 205. In some examples, a label 210 may represent a database system that may access a storage device in order to retrieve, store, and/or process information. In some examples, a label 210 may be an example of a file system associated with the host system 205. The file system may request access to the storage device in order to perform any operations requested by the host system 205.

In accordance with the examples disclosed herein, the host system 205 also includes a driver 215 which interfaces with a memory system 220. The driver 215 may be configured as any combination of software and hardware in order to provide connectivity with the memory system 220. In some examples, the labels 210 interface with the driver 215 in order to process and store information in the memory system 220. For example, Label_1 210-a may be associated with a database system that performs various read and write operations to the storage device. Label_1 210-a may request storage of journaling information associated with these transactions. Similarly, Label_2 210-b may be associated with a file system that requests storage of journaling information associated with operations performed for the host system 205 in the storage device. In some examples, the labels 210 may correspond to similar types of devices. For example, Label_1 210-a may correspond to a file system, whereas Label_2 210-b Label_3 210-c may each correspond to a database system. In some examples, Label_1 210-a may correspond to a file system, while the remaining labels 210-*b*-210-*n*) may correspond to database systems. Additionally, one or more labels 210 configured as database systems may be remotely located from the host system 205, and configured for wired and/or wireless connectivity.

The memory system 220 may include a memory controller 225 configured to manage various operations associated therewith. For example, the memory controller 225 may control access to different portions of the memory system 220 configured for storing different types of information. In some examples, the memory controller 225 may process signals and commands received from external sources such as the driver 215. The memory controller 225 may subsequently perform operations in the memory system 220 in response to receiving the signals and/or commands. The memory system 220 may be an example of the memory system 110 described with reference to FIG. 1. According to the disclosed examples, the memory system 220 may include different portions configured to accommodate different types of operations. For example, the memory system 220 may include a regular/flash portion 230 having non-volatile memory cells for storing information associated with the host system 205. In some examples, the flash portion 230 may occupy a specific amount of storage area within the memory system 220. In some examples, the memory controller 225 may dynamically allocate space to the flash portion 230 depending on the total amount of data currently stored within the memory system 220. Non-journaling data associated with labels 210 may be stored in regular flash 230. As further illustrated in FIG. 2, the host system 205 may issue various non-journaling commands directly to the memory system 220. Accordingly, such non-journaling commands may not originate from the driver 215.

As illustrated in FIG. 2, the memory system 220 may also include a plurality of circular buffers, namely circular buffer_1 235-*a*, circular buffer_2 235-*b*, and circular buffer_n 235-*n* (collectively circular buffer 235). In accordance with the examples disclosed herein, the circular buffer 235 may be used, at least in part, to store journaling information associated with the labels 210. In some cases, the circular buffer may be an example of a data structure that uses a single, fixed-size buffer as if it were connected end-to-end. In some examples, the circular buffer 235 may be an example of an area of a memory device that is used to store data. When the circular buffer 235 is filled, new data may be written starting at the beginning of the circular buffer 235. The circular buffer 235 may be used to hold data written by one process and read by another. In such cases, separate read pointer and a write pointer may be used. In some cases, the circular buffer 235 may include a write pointer and not a read pointer. The circular buffer 235 may include a write pointer 240 which identifies a memory address (i.e., physical address) currently available for storing journaling information within the circular buffer. In some examples, the memory controller 225 does not maintain information regarding specific locations where journaling information is written in the circular buffer 235. Rather, the information is supplied to the circular buffer 235 and written at the memory location specified by the write pointer 240. In some examples, the write pointer 240 may be automatically incremented to identify the next memory location where journaling information may be written. Accordingly, the write pointer 240 may be continually incremented as journaling information is stored within the circular buffer 235. As illustrated in FIG. 2, the portion of the circular buffer 235 which currently contains journaling information is identified by reference numeral 245. In some examples, the write pointer 240 may continually incremented until the circular buffer 235 is full. At this point, the write pointer 240 may be reset to the first memory location within the circular buffer 235. New entries are written in such a manner that any previously written entries are erased.

In accordance with examples disclosed herein, the driver 215 may issue various commands to the memory system 220 in order to request operations associated with journaling information for the labels 210. For example, the driver 215 may issue a first command, such as a "set configuration" command, in order to request creation of a circular buffer 235 in the memory system 220. In some examples, the first command may request configuration of a circular buffer 235 to store journaling information for a single label 210. In some examples, the first command may be issued to set the configuration for a circular buffer 235 to store journaling information for multiple labels 210.

The set configuration command may include one or more parameters which defines a specific size for the circular buffer 235. The parameters may also identify one or more labels 210 that will be associated with the circular buffer 235. In some examples, multiple labels 210 that are used with the same circular buffer 235 may be selected such that their functionalities are similar to each other. For example, if a circular buffer 235 is associated with Label_1 210-*a* and Label_2 210-*b*, the driver 215 may select the labels 210 such that they are both database systems. In some examples, the driver 215 may select the size of the circular buffer 235 based on the frequency of operations being performed in the storage device by the label 210, the size of entries associated with the journaling information, or both.

Once the circular buffer 235 is created, information associated therewith as well as information associated with the set configuration command may be stored in the flash portion 230. In some examples, the memory system 220 may receive a command from the driver 215 to retrieve information regarding the status of the circular buffer 235. For example, the driver 215 may issue a "get configuration" command that identifies a one or more circular buffers 235 in order to obtain various information and parameters associated therewith. The memory controller 225 may process the get configuration command and examine the flash portion 230 in order to retrieve information pertaining to the configuration of the one or more circular buffers 235. In some examples, the get configuration command may specify multiple circular buffers 235 in order to determine the size, labels associated with each circular buffer, etc. In further examples, the get configuration command may be issued without any parameters. The memory system 220 may subsequently return configuration information for all of the circular buffers 235 available.

According to the examples disclosed herein, the driver 215 may issue commands which request specific operations with the circular buffer 235. For example, the memory system 220 may receive a second command to add a log entry to the circular buffer 235. Such a command may be in the form of an "add entry" command for creating a journal log file or entry in the circular buffer 235. In some examples, the add entry command may include parameters which identify the specific label associated with the journaling entry, metadata associated with the journaling entry, and a path which identifies the complete file name of the journal entry. The metadata can be, for example, label identification, path string, timestamp, etc. that has been interpreted by the driver 215. In some examples, the path parameter may identify the complete path associated with the operation being performed on the storage device.

The memory system 220 may also receive a third command, such as a "delete entry" command issued by the driver 215. In some examples, the delete entry command may correspond to the completion of an operation by one of the labels 210 or other information from the circular buffer 235 of the storage device. In some examples, the delete entry command may include parameters for specifying a particular label 210 and a path associated with the files that are synchronized (e.g., fully synchronized) between the host system 205 and the memory system 220. In some examples, the memory controller 225, may process the delete entry command and create a journal entry within the specified circular buffer 235 to invalidate a previously written log entry resulting from an add entry command. For example, the circular buffer 235 may include a write pointer, but it may not be able to retrieve specific data but rather can read the retrieve all of the data in the circular buffer. In such examples, the delete entry may be used to add a new entry that invalidates a previous entry. As such, the delete entry command may include information that may be used to identify the information being deleted. Later, in response to the contents of the circular buffer 235 being retrieved, a controller may discard invalidated data based on the entries generated based on the delete entry commands.

In some examples, Label_1 210-a may perform an operation to create or modify a file within the file system and the driver 215 may issue an add entry command to request the creation of a log entry for journaling information within an associated circular buffer 235. At a later time, Label_1 210-a may complete the operations on the same file, and the driver 215 may issue a delete entry command to create a journal entry within the circular buffer 235 which invalidates the previously created journal entry. Because the circular buffer 235 does not store memory addresses associated with previous journal entries, the add entry commands and delete entry commands are sequentially written within the circular buffer 235. Accordingly, a log entry for delete operation performed by the Label_1 210-a is sequentially stored within the circular buffer 235 in order to invalidate the log entry of the previous add entry command.

In some examples, as a result of activities related to labels 210 performed on the host system 205, the driver may independently elect to send one or more commands to the memory system 220. For example, during the process of creation of a database entry with label 210-a, the driver 215 may first send a create journal entry command. Later, when the driver 215 detects that the database entry is synchronized between the host system 205 and the memory system 220, the driver 215 may send a delete journal entry command to the memory system 220.

As illustrated in FIG. 2, the memory system 220 may also receive a fourth command such as a "restore" command from the driver 215. In some examples, the restore command may be issued based upon occurrence of a failure event by the label 210 or storage device. The restore command may include, for example, the specific label 210 which has experienced the failure. The memory controller 225 may process the restore command to identify the circular buffer 235 associated with the label 210 and return valid entries from the circular buffer 235 in response to the request. In some examples, the circular buffer 235 associated with the label 210 identified in the restore command may be traversed in a reverse direction to identify the valid entries associated with the specified label 210. In some examples, the circular buffer 235 may be configured to store journaling information for multiple labels. Accordingly, only entries associated with the specified label 210 may be examined and returned.

In some examples, the memory controller 225 may traverse the circular buffer 235 in reverse direction to identify the non-deleted entries associated with the specified label 210. For example, if a delete entry is detected, it may be a match to a previously created add entry within the circular buffer 235. The memory controller 225 may discard a subset of the journaling information corresponding to information associated with both the add entry command and its associated delete entry command. Upon completion, the memory controller 225 may return journaling information associated with entries that have been added, but not deleted from the circular buffer 235.

Figure 3:
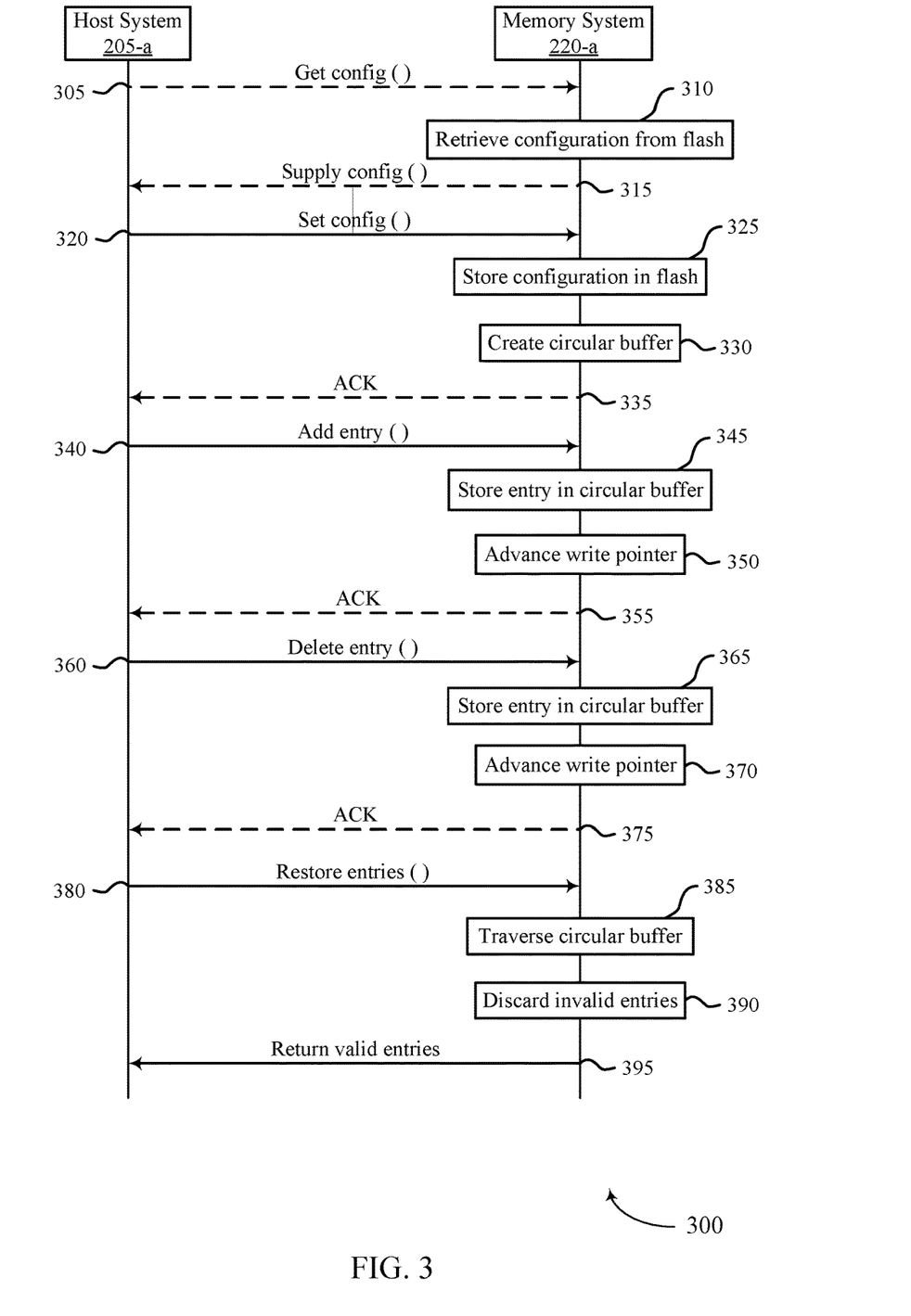
FIG. 3 illustrates an example of a signaling diagram that supports techniques for storing journaling information in accordance with examples as disclosed herein.

FIG. 3 illustrates an example of a signaling diagram 300 that supports techniques for storing journaling information in accordance with examples as disclosed herein. At 305, the host system 205-a may optionally issue a command to obtain configuration information regarding a particular circular buffer 235. In some examples, the command may include one or more parameters which specify details for the command. In some examples, the parameter may be in the form of a particular circular buffer 235. In other examples, the parameter may be in the form of multiple circular buffers 235. As previously discussed, the host system 205-a may issue the command via the driver 215. Similarly, the memory controller 225 within the memory system 220-a may receive and process the command. According to the examples disclosed herein, the memory system 220-a examines the parameter to determine the specific circular buffer 235 associated with the command. The memory system 220-a subsequently identifies the configuration information used to create the circular buffer 235.

The memory system 220-a subsequently examines the flash portion to determine information used to create the circular buffer 235. This is indicated at 310. In some examples, the memory system 220-a may return information corresponding to initial parameters used to create the circular buffer 235. In other examples, the memory device may examine the specified circular buffer 235 and return current information for that circular buffer 235, such as the amount of space currently available to store journaling information. The memory system 220-a may also provide both the initial configuration information as well as the current information for the specified circular buffer 235. This is indicated at 315, where configuration information pertaining to the requested circular buffer 235 is supplied to the host system 205-a. In some examples, if the host system 205-a requests configuration information for multiple circular buffers 235, the memory system 220-a will supply configuration information for the specified circular buffers 235 at 315. This may be done as a single transmission to the host system 205-a or multiple individual transmissions corresponding to the number of circular buffers 235.

At 320, the host system 205-a issues a first command to the memory system 220-a to configure a circular buffer 235. In some examples, the first command may be a set configuration command that includes multiple parameters for creating the circular buffer 235. In some examples the parameter may include a size for the circular buffer 235, and identification of each label 210 that will use the circular buffer 235. The set configuration command may specify, for example, 100 MB for the size of the circular buffer 235 and identify each individual label (e.g., Label_1, Label_2, Label_3, etc.) that will use the circular buffer 235 to store journaling information.

In some examples, the set configuration command may include parameters to specify creation of multiple circular buffers 235. For example, the set configuration command issued at 320 may further specify creation of a second circular buffer 235 having a size of 400 MB for storing journaling information for two labels 210. In some examples, the host system 205-a may issue multiple set configuration commands, wherein each command provides information for creating each individual circular buffer 235. In further examples, the host system 205-a may group multiple labels based on common functionalities. For example, the set configuration command may create a circular buffer 235 for use by multiple database systems. Another circular buffer 235 may be created for use by multiple file systems.

At 325, the memory system 220-a stores the configuration information in a first portion, such as the flash portion 230. At 330, the memory system 220-a creates the circular buffer 235 based, at least in part, on the parameters included in the set configuration command. In some examples, multiple circular buffers 235 may be created when the set configuration command includes such parameters. At 335, the memory device may optionally issue an acknowledgment to the host system 205-a. The acknowledgment may specify, for example, that the set configuration command has been successfully received and implemented. In other examples, the acknowledgment may include any errors encountered during the process. For example, if the set configuration command specifies creation of two circular buffers 235, the acknowledgment command may further include information indicating that one circular buffer 235 was successfully created. Furthermore, the memory device may specify the specific circular buffer 235 created and indicate one or more errors encountered while attempting to create the additional circular buffer 235. In some examples, any acknowledgement described herein may be an example of a negative acknowledgement (e.g., NACK) that the operation associated with the command was not successful.

At 340, the host system 205-a issues a second command to the memory system 220-a. The second command may be in the form of an add entry command which requests creation of a log entry for journaling entry within the circular buffer 235. In some examples, the add entry command may include identification information for the label 210, data associated with the transaction being performed on the storage device, a path corresponding to the transaction within the storage device, etc. The data may be in the form of metadata such as, but not limited to, label identification, path string, timestamp, etc. that has been interpreted by the driver. In some examples, the parameter may correspond to the complete filename associated with the transaction in the storage device.

At 345, an entry is created in the circular buffer 235 associated with the label 210 specified in the add entry command. In some examples, the memory system 220-a may examine the label 210 included in the add entry command in order to determine the circular buffer 235 which stores journaling information for the label 210. The memory device may subsequently examine the write pointer 240 for the circular buffer 235, and access the memory address (i.e., physical address) specified by the write pointer 240. The memory system 220-a subsequently stores the entry beginning at the specified memory address. At 350, the write pointer 240 is advanced to specify the next memory address available for writing additional entries. At 355, the memory system 220-a may optionally send an acknowledgment signal indicating to the host system 205-a that the entry has been successfully added to the circular buffer 235. In some examples, the acknowledgment may be accompanied by any errors that may have occurred during the process. In other examples, failure to transmit the acknowledgment signal may be interpreted as a failure to successfully implement the command.

At 360, the host system 205-a issues a third command to delete an entry from the circular buffer 235. In some examples, the third command may be in the form of a delete entry command having one or more parameters. The parameters may specify, for example, a particular label associated with the transaction, metadata for invalidating a previously written entry within the circular buffer 235, as well as a path. As previously discussed, the circular buffer 235 does not maintain memory addresses of transactions being stored therein. Rather, write operations are performed at the memory address specified by the write pointer 240. It is therefore not possible to delete a previously written entry from physical non-volatile memory through issuing a delete command. According to the disclosed examples, a subsequent entry is created with sufficient information to invalidate an associated entry that has been previously written in the circular buffer 235.

At 365, an entry is created within the circular buffer 235 associated with the label 210 specified by the parameter of the delete entry command. As previously discussed, this may be done by accessing the memory address specified by the write pointer, and storing information pertaining to the entry beginning at the specified memory address. At 370, the write pointer is advanced. In some examples, this may correspond to determining the last memory address utilized to store the entry within the circular buffer 235 and assigning the next available memory address as a value to the write pointer. At 375, the memory system 220-a may optionally send an acknowledgment to the host system 205-a in order to indicate successful implementation of the received delete entry command. In some examples, the acknowledgment may further be accompanied by information pertaining to errors that may have occurred while creating the entry within the circular buffer 235. In other examples, failure to receive an acknowledgment signal may be interpreted by the host system 205-a as a failure to complete the transaction.

At 380, the host system 205-a issues a fourth command to the memory system 220-a. The fourth command may correspond to a restore command which may be used to reconstruct transactions in the storage device performed by the specified label. In some examples, the restore command may be issued as a result of a failure event such as, for example, a power outage, hardware failure, software failure, etc. The restore command may further specify a particular label 210 for which transactions in the memory system 220-a are to be restored. Upon receiving the restore entries command, the memory system 220-a examines the label 210 in order to identify the specific circular buffer 235 used for storing its journaling information.

At 385, the memory system 220-a traverses the contents of the circular buffer 235. In some examples, the memory system 220-a accesses the memory address currently specified by the write pointer 240, and performs a reverse traversal of its contents. More particularly, the memory system 220-a begins from the current memory address of the write pointer 240 and retrieves entries associated with the label in reverse order to the first memory address of the circular buffer 235. The memory system 220-a further identifies log entries associated with delete entry commands that may have a previous log from an add entry command associated therewith. The log entries resulting from delete entry commands as well as their associated log entries resulting from add entry commands are both discarded as invalid entries. This is indicated at 390.

At 395 valid entries associated with the specified label 210 are returned to the host system 205-a. In some examples, the valid entries correspond to entries created from add entry commands. Furthermore, such entries do not include a corresponding log entry created using a delete entry command. In some examples, the host system 205-a may utilize information pertaining to the valid entries received from the memory system 220-a in order to re-create and/or recover information or operations associated with the storage device. In further examples, the restore entries command issued at 380 may specify multiple labels 210. The memory system 220-a may traverse one or more circular buffers 235 associated with each of the labels 210 and return valid entries to the host system 205-a.

For example, if the restore command specifies two labels 210 that utilize the same circular buffer 235, then one circular buffer 235 is traversed. If each label utilizes a different circular buffer 235, then the memory system 220-a will traverse each of the circular buffers 235. In some examples, a single transaction may be performed to send valid entries for each specified label 210. In other examples, the memory system 220-a may individually transmit valid entries associated with a particular label 210. For example, if two labels are specified in the restore entries command, the memory device may transmit valid entries associated with the first label 210 in one transaction, and transmit valid entries associated with the second label 210 in a second transaction.

Figure 4:
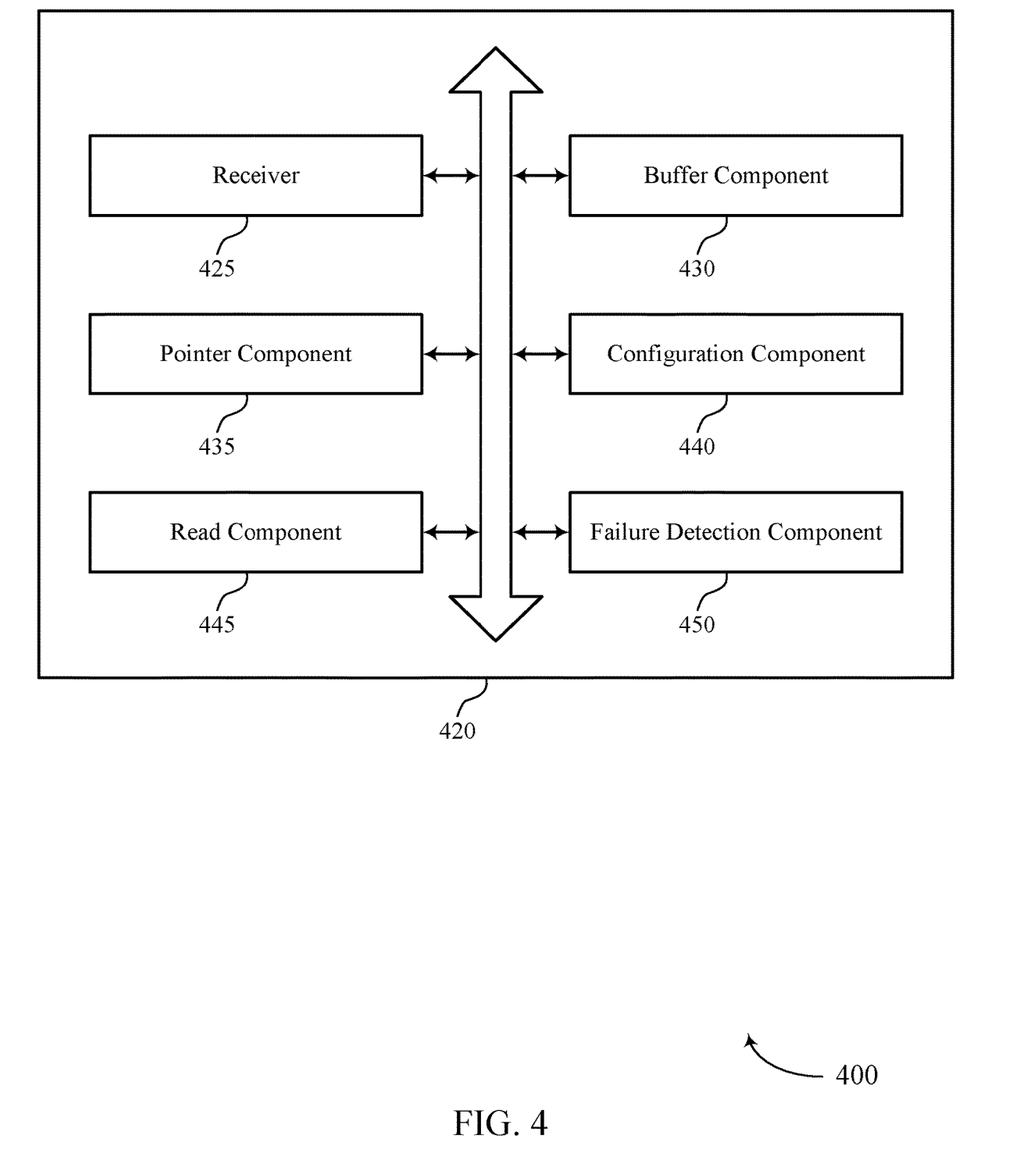
FIG. 4 shows a block diagram of a memory system that supports techniques for storing journaling information in accordance with examples as disclosed herein.

FIG. 4 shows a block diagram 400 of a memory system 420 that supports techniques for storing journaling information in accordance with examples as disclosed herein. The memory system 420 may be an example of aspects of a memory system as described with reference to FIGS. 1 through 3. The memory system 420, or various components thereof, may be an example of means for performing various aspects of techniques for storing journaling information as described herein. For example, the memory system 420 may include a receiver 425, a buffer component 430, a pointer component 435, a configuration component 440, a read component 445, a failure detection component 450, or any combination thereof. Each of these components may communicate, directly or indirectly, with one another (e.g., via one or more buses).

The receiver 425 may be configured as or otherwise support a means for receiving a first command to configure a circular buffer using memory cells of a nonvolatile memory device, the first command including one or more labels associated with the circular buffer. The buffer component 430 may be configured as or otherwise support a means for configuring the circular buffer based at least in part on receiving the first command. In some examples, the receiver 425 may be configured as or otherwise support a means for receiving a second command to write journaling data to the nonvolatile memory device based at least in part on configuring the circular buffer, the second command specifying a label of the one or more labels. In some examples, the buffer component 430 may be configured as or otherwise support a means for generating an entry at a physical address indicated by a pointer of the circular buffer available to store the journaling data in the circular buffer based at least in part on the label specified by the second command.

In some examples, the pointer component 435 may be configured as or otherwise support a means for updating the physical address indicated by the pointer to a next available physical address in the circular buffer based at least in part on generating the entry.

In some examples, the configuration component 440 may be configured as or otherwise support a means for storing configuration information for a first portion of the nonvolatile memory device configured to include the circular buffer in a second portion of the nonvolatile memory device.

In some examples, the receiver 425 may be configured as or otherwise support a means for receiving a third command to write a second type of journaling data to the nonvolatile memory device that invalidates a previous entry stored in the circular buffer. In some examples, the buffer component 430 may be configured as or otherwise support a means for generating a second entry for the second type of journaling data at the physical address indicated by the pointer of the circular buffer, the second type of journaling data including, at least in part, information for invalidating the previous entry stored in the circular buffer.

In some examples, the receiver 425 may be configured as or otherwise support a means for receiving a fourth command to recover one or more operations of a memory system using the journaling data stored in the circular buffer, the fourth command including a selected label from the one or more labels associated with the circular buffer. In some examples, the read component 445 may be configured as or otherwise support a means for retrieving the journaling data associated with valid entries in the circular buffer based at least in part on receiving the fourth command.

In some examples, to support retrieving the journaling data, the read component 445 may be configured as or otherwise support a means for traversing entries stored in the circular buffer in reverse sequential order. In some examples, to support retrieving the journaling data, the read component 445 may be configured as or otherwise support a means for transmitting the journaling data to a host system.

In some examples, to support retrieving the journaling data, the read component 445 may be configured as or otherwise support a means for identifying a subset of the journaling data that is invalid. In some examples, to support retrieving the journaling data, the read component 445 may be configured as or otherwise support a means for discarding the subset of the journaling data that is invalid.

In some examples, the failure detection component 450 may be configured as or otherwise support a means for identifying a failure event associated with the memory system, where receiving the fourth command is based at least in part on identifying the failure event.

In some examples, the receiver 425 may be configured as or otherwise support a means for receiving a fifth command to retrieve configuration information for the circular buffer from the nonvolatile memory device.

In some examples, the label is indicative of a source associated with the second command.

In some examples, the generated entry indicates information pertaining to a transaction associated with a memory system.

In some examples, the second command further includes an indication of a source, metadata, timestamp, file path, file name associated with the journaling data, or a size of the circular buffer, or any combination thereof. In some examples, the second command further includes an indication of one or more of a source, metadata, timestamp, file path, and file name associated with the journaling data.

In some examples, the second command is generated by a driver based at least in part on activities related to journaling. In some examples, the first command further includes a size of the circular buffer.

In some examples, the receiver 425 may be configured as or otherwise support a means for receiving at least one additional first command to configure a second circular buffer, each of the at least one additional first command including one or more labels associated with the second circular buffer. In some examples, the configuration component 440 may be configured as or otherwise support a means for configuring the second circular buffer based at least in part on receiving the at least one additional first command.

In some examples, the first command includes a plurality of labels associated with the circular buffer. In some examples, the plurality of labels are indicative of sources having common functionalities.

In some examples, the pointer component 435 may be configured as or otherwise support a means for determining that the pointer indicates a last sequential physical address of the circular buffer. In some examples, the configuration component 440 may be configured as or otherwise support a means for reconfiguring the pointer to indicate a first sequential physical address of the circular buffer based at least in part on determining that the pointer is indicating the last sequential physical address.

Figure 5:
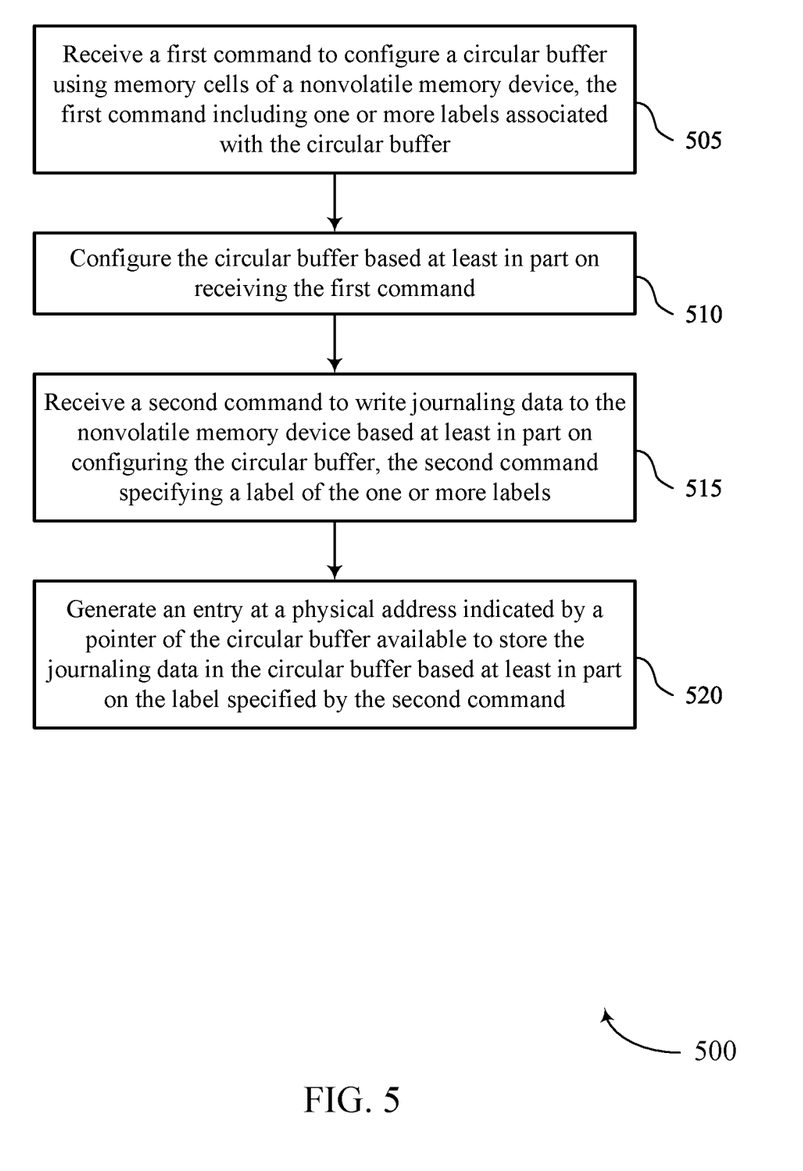
FIG. 5 shows a flowchart illustrating a method or methods that support techniques for storing journaling information in accordance with examples as disclosed herein.

FIG. 5 shows a flowchart illustrating a method 500 that supports techniques for storing journaling information in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a first command to configure a circular buffer using memory cells of a nonvolatile memory device, the first command including one or more labels associated with the circular buffer. The operations of 505 may be performed in accordance with examples as disclosed herein. In some examples, aspects of the operations of 505 may be performed by a receiver 425 as described with reference to FIG. 4.

At 510, the method may include configuring the circular buffer based at least in part on receiving the first command. The operations of 510 may be performed in accordance with examples as disclosed herein. In some examples, aspects of the operations of 510 may be performed by a buffer component 430 as described with reference to FIG. 4.

At 515, the method may include receiving a second command to write journaling data to the nonvolatile memory device based at least in part on configuring the circular buffer, the second command specifying a label of the one or more labels. The operations of 515 may be performed in accordance with examples as disclosed herein. In some examples, aspects of the operations of 515 may be performed by a receiver 425 as described with reference to FIG. 4.

At 520, the method may include generating an entry at a physical address indicated by a pointer of the circular buffer available to store the journaling data in the circular buffer based at least in part on the label specified by the second command. The operations of 520 may be performed in accordance with examples as disclosed herein. In some examples, aspects of the operations of 520 may be performed by a buffer component 430 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command to configure a circular buffer using memory cells of a nonvolatile memory device, the first command including one or more labels associated with the circular buffer; configuring the circular buffer based at least in part on receiving the first command; receiving a second command to write journaling data to the nonvolatile memory device based at least in part on configuring the circular buffer, the second command specifying a label of the one or more labels; and generating an entry at a physical address indicated by a pointer of the circular buffer available to store the journaling data in the circular buffer based at least in part on the label specified by the second command.

Aspect 2: The method, apparatus, or non-transitory computer-readable medium of aspect 1, further including operations, features, circuitry, logic, means, or instructions, or any combination thereof for updating the physical address indicated by the pointer to a next available physical address in the circular buffer based at least in part on generating the entry.

Aspect 3: The method, apparatus, or non-transitory computer-readable medium of any of aspects 1 through 2, further including operations, features, circuitry, logic, means, or instructions, or any combination thereof for storing configuration information for a first portion of the nonvolatile memory device configured to include the circular buffer in a second portion of the nonvolatile memory device.

Aspect 4: The method, apparatus, or non-transitory computer-readable medium of any of aspects 1 through 3, further including operations, features, circuitry, logic, means, or instructions, or any combination thereof for receiving a third command to write a second type of journaling data to the nonvolatile memory device that invalidates a previous entry stored in the circular buffer and generating a second entry for the second type of journaling data at the physical address indicated by the pointer of the circular buffer, the second type of journaling data including, at least in part, information for invalidating the previous entry stored in the circular buffer.

Aspect 5: The method, apparatus, or non-transitory computer-readable medium of any of aspects 1 through 4, further including operations, features, circuitry, logic, means, or instructions, or any combination thereof for receiving a fourth command to recover one or more operations of a memory system using the journaling data stored in the circular buffer, the fourth command including a selected label from the one or more labels associated with the circular buffer and retrieving the journaling data associated with valid entries in the circular buffer based at least in part on receiving the fourth command.

Aspect 6: The method, apparatus, or non-transitory computer-readable medium of aspect 5, where retrieving the journaling data further includes operations, features, circuitry, logic, means, or instructions, or any combination thereof for traversing entries stored in the circular buffer in reverse sequential order and transmitting the journaling data to a host system.

Aspect 7: The method, apparatus, or non-transitory computer-readable medium of any of aspects 5 through 6, where retrieving the journaling data further includes operations, features, circuitry, logic, means, or instructions, or any combination thereof for identifying a subset of the journaling data that is invalid and discarding the subset of the journaling data that is invalid.

Aspect 8: The method, apparatus, or non-transitory computer-readable medium of any of aspects 5 through 7, further including operations, features, circuitry, logic, means, or instructions, or any combination thereof for identifying a failure event associated with the memory system, where receiving the fourth command is based at least in part on identifying the failure event.

Aspect 9: The method, apparatus, or non-transitory computer-readable medium of any of aspects 1 through 8, further including operations, features, circuitry, logic, means, or instructions, or any combination thereof for receiving a fifth command to retrieve configuration information for the circular buffer from the nonvolatile memory device.

Aspect 10: The method, apparatus, or non-transitory computer-readable medium of any of aspects 1 through 9, where the label is indicative of a source associated with the second command.

Aspect 11: The method, apparatus, or non-transitory computer-readable medium of any of aspects 1 through 10, where the generated entry indicates information pertaining to a transaction associated with a memory system.

Aspect 12: The method, apparatus, or non-transitory computer-readable medium of any of aspects 1 through 11, where the second command further comprises an indication of a source, metadata, timestamp, file path, file name associated with the journaling data, or a size of the circular buffer, or any combination thereof.

Aspect 13: The method, apparatus, or non-transitory computer-readable medium of any of aspects 1 through 12, where the second command is generated by a driver based at least in part on activities related to journaling.

Aspect 14: The method, apparatus, or non-transitory computer-readable medium of any of aspects 1 through 13, further including operations, features, circuitry, logic, means, or instructions, or any combination thereof for receiving at least one additional first command to configure a second circular buffer, each of the at least one additional first command including one or more labels associated with the second circular buffer and configuring the second circular buffer based at least in part on receiving the at least one additional first command.

Aspect 15: The method, apparatus, or non-transitory computer-readable medium of any of aspects 1 through 14, where the first command includes a plurality of labels associated with the circular buffer and the plurality of labels are indicative of sources having common functionalities.

Aspect 16: The method, apparatus, or non-transitory computer-readable medium of any of aspects 1 through 15, further including operations, features, circuitry, logic, means, or instructions, or any combination thereof for determining that the pointer indicates a last sequential physical address of the circular buffer and reconfiguring the pointer to indicate a first sequential physical address of the circular buffer based at least in part on determining that the pointer is indicating the last sequential physical address.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a first command to configure a plurality of circular buffers using memory cells of a nonvolatile memory device, the first command including one or more labels, wherein each label of the one or more labels corresponds to a subsystem associated with a host system;
configuring the plurality of circular buffers based at least in part on receiving the first command, wherein each circular buffer of the plurality of circular buffers corresponds to a respective label of the one or more labels;
receiving a second command to write journaling data to the nonvolatile memory device based at least in part on configuring the plurality of circular buffers, the second command specifying a label of the one or more labels; and
generating an entry at a physical address indicated by a pointer of a circular buffer of the plurality of circular buffers corresponding to the label available to store the journaling data in the circular buffer based at least in part on the second command.

2. The method of claim 1, further comprising:
updating the physical address indicated by the pointer to a next available physical address in the circular buffer based at least in part on generating the entry.

3. The method of claim 1, further comprising:
storing configuration information for a first portion of the nonvolatile memory device configured to include the circular buffer in a second portion of the nonvolatile memory device.

4. The method of claim 1, further comprising:
receiving a third command to write a second type of journaling data to the nonvolatile memory device that invalidates a previous entry stored in the circular buffer; and
generating a second entry for the second type of journaling data at the physical address indicated by the pointer of the circular buffer, the second type of journaling data including, at least in part, information for invalidating the previous entry stored in the circular buffer.

5. The method of claim 1, further comprising:
receiving a fourth command to recover one or more operations of a memory system using the journaling data stored in the circular buffer, the fourth command including a selected label from the one or more labels associated with the circular buffer; and
retrieving the journaling data associated with valid entries in the circular buffer based at least in part on receiving the fourth command.

6. The method of claim 5, wherein retrieving the journaling data further comprises:
traversing entries stored in the circular buffer in reverse sequential order; and
transmitting the journaling data to a host system.

7. The method of claim 5, wherein retrieving the journaling data further comprises:
identifying a subset of the journaling data that is invalid; and
discarding the subset of the journaling data that is invalid.

8. The method of claim 5, further comprising:
identifying a failure event associated with the memory system, wherein receiving the fourth command is based at least in part on identifying the failure event.

9. The method of claim 1, further comprising:
receiving a fifth command to retrieve configuration information for the circular buffer from the nonvolatile memory device.

10. The method of claim 1, wherein the label is indicative of a source associated with the second command.

11. The method of claim 1, wherein the generated entry indicates information pertaining to a transaction associated with a memory system.

12. The method of claim 1, wherein the second command further comprises an indication of a source, metadata, timestamp, file path, file name associated with the journaling data, or a size of the circular buffer, or any combination thereof.

13. The method of claim 1, wherein the second command is generated by a driver based at least in part on activities related to journaling.

14. The method of claim 1, wherein receiving the first command comprises:
receiving the first command to configure the circular buffer and a second circular buffer of the plurality of circular buffers, the first command including one or more labels associated with the second circular buffer, wherein configuring the plurality of circular buffers is based at least in part on receiving the first command.

15. The method of claim 1, wherein:
the first command includes a plurality of labels associated with the circular buffer; and
the plurality of labels are indicative of sources having common functionalities.

16. The method of claim 1 further comprising:
determining that the pointer indicates a last sequential physical address of the circular buffer; and
reconfiguring the pointer to indicate a first sequential physical address of the circular buffer based at least in part on determining that the pointer is indicating the last sequential physical address.

17. A non-transitory computer-readable medium storing code, the code comprising instructions executable by one or more processors to:
receive a first command to configure a plurality of circular buffers using memory cells of a nonvolatile memory device, the first command including one or more labels, wherein each label of the one or more labels corresponds to a subsystem associated with a host system;

configure the plurality of circular buffers based at least in part on receiving the first command, wherein each circular buffer of the plurality of circular buffers corresponds to a respective label of the one or more labels;

receive a second command to write journaling data to the nonvolatile memory device based at least in part on configuring the plurality of circular buffers, the second command specifying a label of the one or more labels; and generate an entry at a physical address indicated by a pointer of a circular buffer of the plurality of circular buffers corresponding to the label available to store the journaling data in the circular buffer based at least in part on the second command.

18. The non-transitory computer-readable medium of claim 17, wherein the instructions are further executable by the one or more processors to:

update the physical address indicated by the pointer to a next available physical address in the circular buffer based at least in part on generating the entry.

19. The non-transitory computer-readable medium of claim 17, wherein the instructions are further executable by the one or more processors to:

store configuration information for a first portion of the nonvolatile memory device configured to include the circular buffer in a second portion of the nonvolatile memory device.

20. The non-transitory computer-readable medium of claim 17, wherein the instructions are further executable by the one or more processors to:

receive a third command to write a second type of journaling data to the nonvolatile memory device that invalidates a previous entry stored in the circular buffer; and generate a second entry for the second type of journaling data at the physical address indicated by the pointer of the circular buffer, the second type of journaling data including, at least in part, information for invalidating the previous entry stored in the circular buffer.

21. The non-transitory computer-readable medium of claim 17, wherein the instructions are further executable by the one or more processors to:

receive a fourth command to recover one or more operations of a memory system using the journaling data stored in the circular buffer, the fourth command including a selected label from the one or more labels associated with the circular buffer; and retrieve the journaling data associated with valid entries in the circular buffer based at least in part on receiving the fourth command.

22. A memory system, comprising:
one or more memory devices; and
processing circuitry coupled with the one or more memory devices and configured to cause the memory system to:

receive a first command to configure a plurality of circular buffers using memory cells of a nonvolatile memory device, the first command including one or more labels, wherein each label of the one or more labels corresponds to a subsystem associated with a host system;

configure the plurality of circular buffers based at least in part on receiving the first command, wherein each circular buffer of the plurality of circular buffers corresponds to a respective label of the one or more labels;

receive a second command to write journaling data to the nonvolatile memory device based at least in part on configuring the plurality of circular buffers, the second command specifying a label of the one or more labels; and generate an entry at a physical address indicated by a pointer of a circular buffer of the plurality of circular buffers corresponding to the label available to store the journaling data in the circular buffer based at least in part on the second command.

23. The memory system of claim 22, wherein the processing circuitry is further configured to cause the memory system to:

update the physical address indicated by the pointer to a next available physical address in the circular buffer based at least in part on generating the entry.

24. The memory system of claim 22, wherein the processing circuitry is further configured to cause the memory system to:

store configuration information for a first portion of the nonvolatile memory device configured to include the circular buffer in a second portion of the nonvolatile memory device.

25. The memory system of claim 22, wherein the processing circuitry is further configured to cause the memory system to:

receive a third command to write a second type of journaling data to the nonvolatile memory device that invalidates a previous entry stored in the circular buffer; and generate a second entry for the second type of journaling data at the physical address indicated by the pointer of the circular buffer, the second type of journaling data including, at least in part, information for invalidating the previous entry stored in the circular buffer.

* * * * *